United States Patent [19]
Roach

[11] 3,875,439
[45] Apr. 1, 1975

[54] MOUNTING CLIP FOR A DYNAMOELECTRIC MACHINE

[75] Inventor: Mary E. Roach, De Kalb, Ill.

[73] Assignee: General Electric Company, Fort Wayne, Ind.

[22] Filed: Sept. 17, 1973

[21] Appl. No.: 398,144

[52] U.S. Cl. .......................... 310/68 C, 318/221 H
[51] Int. Cl. ....................................... H02k 11/00
[58] Field of Search ............. 310/68 C, 68; 318/221

[56] References Cited
UNITED STATES PATENTS

| | | | |
|---|---|---|---|
| 1,784,624 | 12/1930 | Ford | 46/61 |
| 2,298,155 | 10/1942 | Perkins | 172/36 |
| 2,882,002 | 4/1959 | Seely | 248/205 |
| 3,311,764 | 3/1967 | Linkous | 310/68 |
| 3,319,096 | 5/1967 | Eberhart et al. | 310/68 R |

Primary Examiner—J. D. Miller
Assistant Examiner—Robert J. Hickey
Attorney, Agent, or Firm—Joseph E. Papin

[57] ABSTRACT

A dynamoelectric machine is provided with a stator having windings therein with end turns of the windings adjacent an end face of the stator. A structural member of the dynamoelectric machine is mounted on the stator, and a mounting clip is disposed in engagement between the stator and the structural member for mounting an overload protector adjacent the end turns of the windings.

19 Claims, 9 Drawing Figures

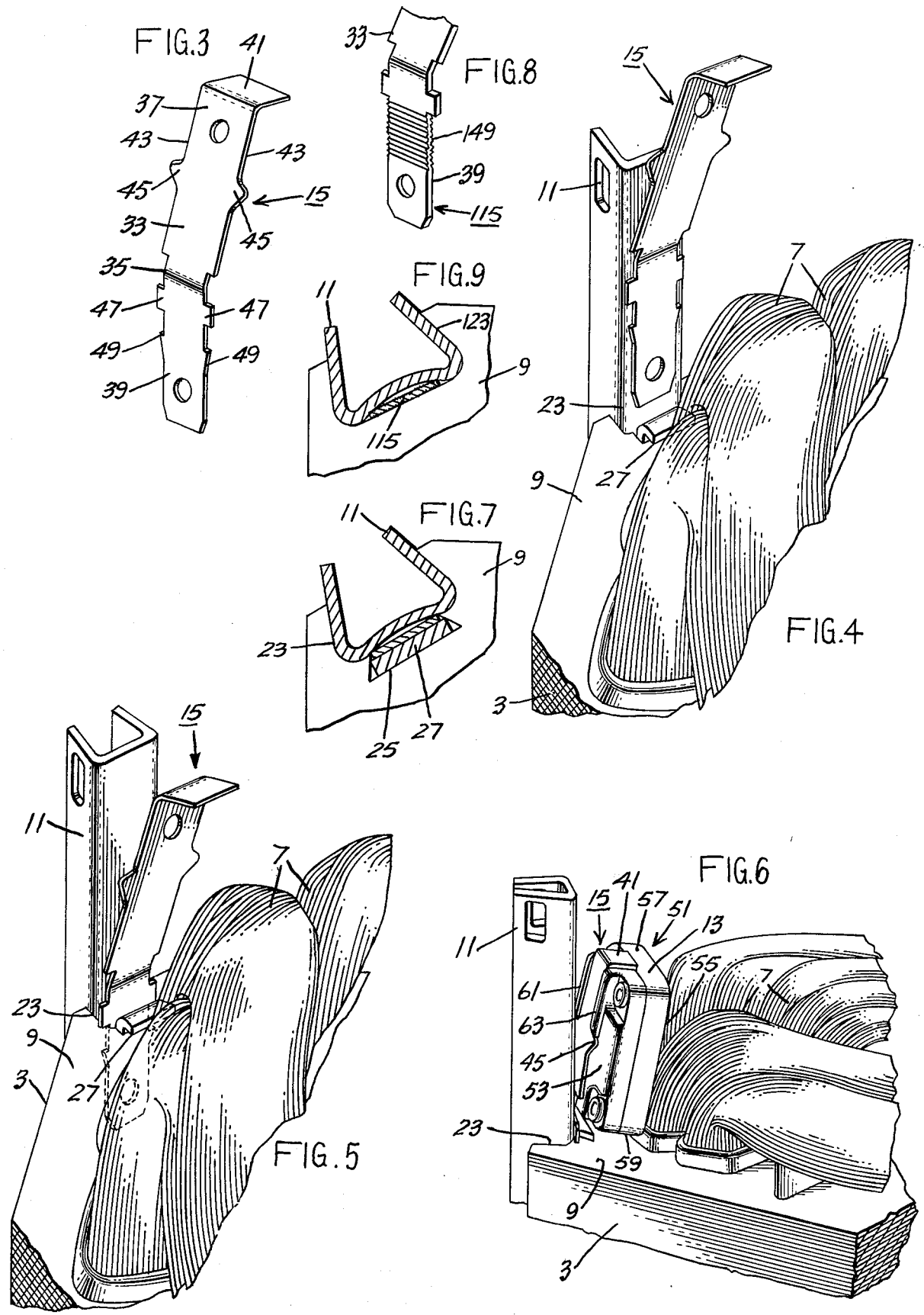

MOUNTING CLIP FOR A DYNAMOELECTRIC MACHINE

FIELD OF THE INVENTION

This invention relates in general to dynamoelectric machines and in particular to means for mounting a switching device thereon.

BACKGROUND OF THE INVENTION

Dynamoelectric machines, such as an electric motor of the single phase induction type for instance, normally utilize thermal overload protectors to deenergize stator windings by interrupting current flow thereto in the event the windings for some reasons become overheated. The thermal overload protectors are mounted adjacent to the end turns of the stator windings for sensing the ambient temperature adjacent thereto.

In the past, thermal overload protectors were mounted on a bracket, such as a terminal board for instance, which was in turn mounted on a stationary structural part of the dynamoelectric machine. The mounting of the thermal overload protector and terminal boards was by screws and/or clips, but in either event there may be noted the disadvantageous or undesirable feature of two time consuming and costly mounting operations. Of course, in the modern day manufacture or assembly line production of electric motors, it is obligatory to eliminate as many time consuming, and therefore costly, assembly operations as possible.

A principle object of the present invention is to provide a novel means for mounting a switching device on a dynamoelectric machine which overcomes the above discussed disadvantageous or undesirable features, as well as others, of the past dynamoelectric machines, and this, as well as other objects and advantageous features of the present invention, will be in part apparent and in part pointed out in the specification which follows.

SUMMARY OF THE INVENTION

In general and in one form of the invention, a dynamoelectric machine has a stator with a peripheral surface and at least one end face intersecting therewith. A plurality of windings in the stator have a generally annular grouping of end turns extending from the one end face, and the end turns have a portion spaced generally radially inwardly of the peripheral surface of the stator. Means for sensing the ambient temperature adjacent the end turns is operable generally to protect the windings in the event of an overload condition thereof. In combination with such dynamoelectric machine, there is provided means secured in displacement preventing engagement with at least a part of the stator generally adjacent the one end face thereof for mounting the sensing means between the peripheral surface of the stator and the portion of the end turns radially inwardly thereof and between the one end face and the free end of the end turns extending from the one end face.

Also in general, a dynamoelectric machine in one form of the invention has an end face of a stator adjacent end turns of stator windings. Means for sensing the ambient temperature adjacent the end turns protects the stator windings in the event of an overload condition, and the sensing means includes a casing having opposite face portions interposed between opposite end portions. In combination with such dynamoelectric machine, there is provided means adapted to be secured in displacement preventing engagement with the stator adjacent the one end face thereof. The secured means includes means for generally side-wise displacement preventing engagement with the one opposite face portion of the casing and for positioning the other opposite face portion thereof at least in close proximity to a portion of the end turns. Means is also engaged with the casing for maintaining one opposite end portion thereof at least in close proximity with the one end face of the stator adjacent the end turns.

More particularly and also in general, there is provided in one form of the invention a dynamoelectric machine having a stator with a peripheral portion and at least one end face on the stator intersecting with the peripheral portion. At least one groove in the peripheral portion intersects with the end face, and a beam disposed in the groove extends therefrom past the one end face for supporting another structural component of the dynamoelectric machine. A plurality of windings in the stator have a generally annular grouping of end turns adjacent the one end face, and the end turns have a portion spaced generally radially inwardly of the peripheral portion of the stator. Means for sensing ambient temperature adjacent the end turns protects the windings in the event of an overload condition. In combination with such dynamoelectric machine, there is provided a space between confronting surfaces of the beam and the groove within the groove, and a metallic strip disposes the sensing means adjacent the one end face and between the peripheral portion of the stator and the portion of the end turns spaced radially inwardly therefrom. The metallic strip includes opposite ends with one of the opposite ends being inserted into the space between the beam and the groove. Means on the one opposite end of the strip is provided for displacement preventing engagement with at least a part of the stator within the groove, and means is also provided on the strip for abutment with the one end face for positively limiting the insertion of the one opposite end of the strip into the space. Further, means on the other of the opposite ends of the strip is disposed between the peripheral portion of the stator and the portion of the end turns generally radially inwardly thereof for mounting engagement with the sensing means. The other opposite end of the strip is engaged with the sensing means to maintain it against displacement from a position adjacent the one end face and between the peripheral portion of the stator and the portion of the end turns radially inwardly thereof and at least closely adjacent the end turns.

BRIEF DESCRIPTION OF THE DRAWINGS

FIG. 3 is a perspective view of a mounting clip of this invention;

FIGS. 4 and 5 are perspective views illustrating the invention of the mounting clip of FIG. 3 into mounting engagement between the stator and a mounting beam of FIG. 2;

FIG. 6 is a perspective view of the mounting clip mounting a switch means on an end face of the stator adjacent a grouping of end turns of windings in the stator;

FIG. 7 is a sectional view showing the mounting clip engaged between the mounting beam and a lamination holding means of the stator;

FIG. 8 is a fragmentary perspective view illustrating an alternative mounting clip structure of the present invention having serrations in the lower body portion thereof; and FIG. 9 is a sectional view showing the mounting clip of FIG. 8 engaged directly between the mounting beam and the stator.

Corresponding reference characters indicate corresponding parts throughout the several views of the drawings.

Figure 1:
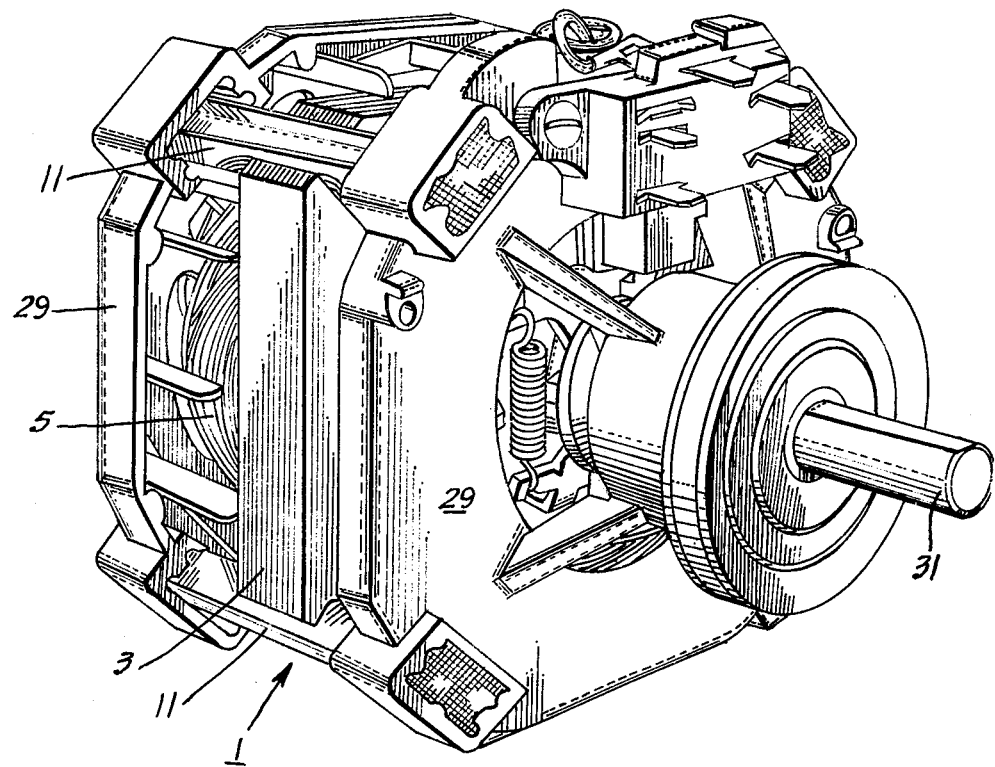
FIG. 1 is a perspective view of a dynamoelectric machine of this invention.

The exemplifications set out herein illustrate the invention in one form thereof, and such exemplifications are not to be construed as limiting in any manner.

DETAILED DESCRIPTION OF THE DRAWINGS

Referring now to the drawings in general, there is shown at 1 in one form of the invention a dynamoelectric machine, such as an electric motor, having a stator 3, and stator windings 5 have a generally annular grouping of end turns 7 adjacent an end face 9 of the stator. A plurality of structural members, such as elongate beams 11, are mounted on stator 3, and switch means, such as a thermal overload protector 13 or the like, is provided for protecting stator windings 5 in the event of a current or thermal overload condition, as well known in the art. Mounting means, such as an elongate clip or strip member 15, is disposed in engagement between stator 3 and beam 11 for mounting a switch sensing means, such as overload protector 13, adjacent to end turns 7 of stator winding 5.

Figure 2:
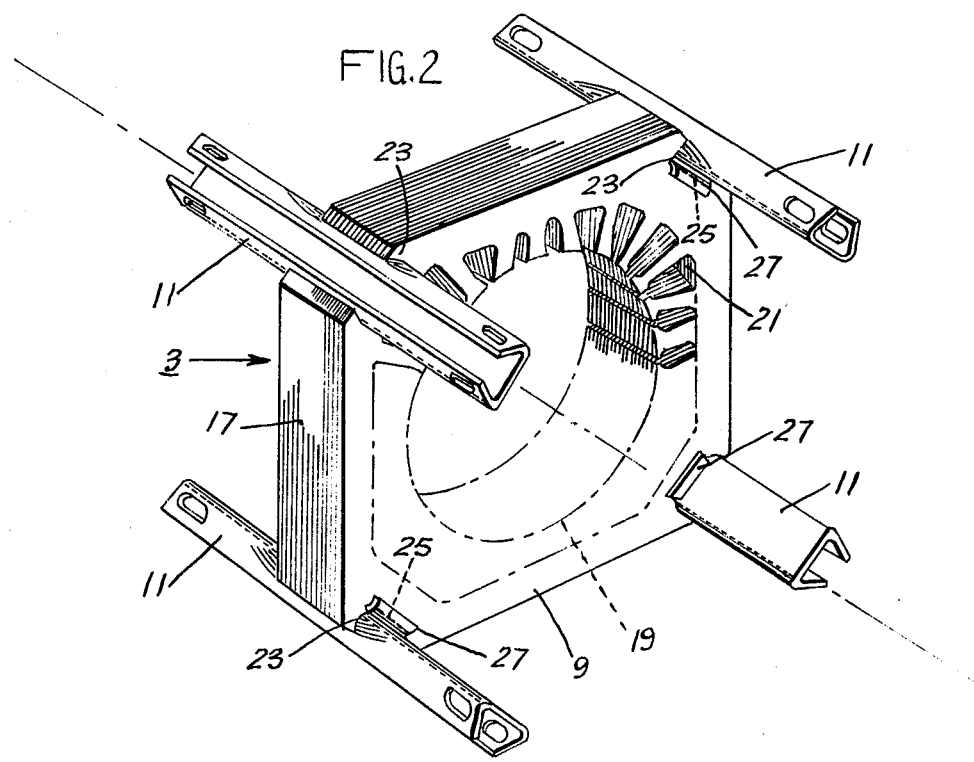
FIG. 2 is a perspective view of a stator and mounting beams of the dynamoelectric machine of FIG. 1.

As shown in FIG. 2, stator 3 comprises a stack of laminations 17 of magnetic material, such as electrical grade steel stock or the like, having opposite end faces 9 of which only one is shown, and a generally axially extending bore 19 and winding slots 21 in which stator windings 5 are disposed are provided in the lamination stack between the opposite end faces thereof. Referring now also to FIG. 7, a plurality of groove 23 or the like, are provided adjacent the periphery of lamination stack 17 intersecting therewith and extending generally axially thereof between end faces 9, and aperture means, such as a plurality of openings, recess means or grooves 25 or the like, may be provided in the lamination stack and are shown intersecting with the base walls of the larger grooves 23. Holding means, such as stator keys or straps 27, may be disposed in the recesses 25 in displacement engagement with the laminations of stack 17, as is well known in the art, and as fully shown and described in the Charles W. Otto copending patent application Ser. No. 246,315 filed Apr. 21, 1972 and assigned to the assignee of this patent application, beams 11 are disposed in stator grooves 23 in displacement preventing displacement with stator 3. The free or opposite ends of beams 11 are connected in supporting engagement with structural components of dynamoelectric machine 1, such as opposite end frames 29, as shown in FIG. 1, and a rotor supporting shaft 31, which extends generally coaxially through stator bore 19, has its opposite end portions suitably journalled in the end frames in a manner well known in the art.

Referring now to FIGS. 3 and 6, mounting or clip member 15 is stamped and formed from relatively thin sheet metal or strip thereof, but it is also contemplated that the clip member may be made by other methods, such as extrusion or molding for instance, and formed from other materials such as various plastic resins or the like. Clip member 15 is provided with an elongate body 33 which is bent at 35 thereby to define generally an upper or switch means supporting portion 37 and a lower or engagement portion 39. A tab or flange 41 on the upper portion 37 of clip member 15 is bent over from body 33 for abutment, positioning or resiliently urging engagement with overload protector 13, and oppositely spaced abutment means, such as opposite side edges 43 of body 33, are provided for engagement with overload protector 13 to obviate lateral or side-wise displacement thereof relative to clip member 15. Oppositely extending projections 45 are integrally formed with upper portion 37 between tab 41 and bend 35 for supporting engagement with overload protector 13, and a pair of oppositely extending locating, reference or insertion limiting means, such as projections 47, are also integrally formed with the lower portion of body 33 and predeterminately disposed below and adjacent bend 35 for abutment with stator face 9 about groove means 23 therein to limit the extent of engagement of clip member 15 between stator 3 and beam 11 and accurately locate the clip member relative to the adjacent cooperating components of dynamoelectric machine 1. Locking or displacement preventing means, such as a pair of oppositely extending barbs or projections 49 are integrally formed on lower portion 39 of body 33 for locking or displacement preventing engagement with at least a part of stator 3 adjacent end face 9, i.e., one of the laminations of stator stack 17, upon the insertion of clip member 15 into recess 25 between beam 11 and slot key 27, as discussed hereafter. It may be noted that other locking means for displacement preventing engagement with stator 3, such as a plurality of serrations or the like, may be provided on clip member side edges 43, and such construction is also contemplated as being within the scope of the invention.

Overload protector 13 is provided with a housing or casing 51 which, as shown in FIG. 6, has opposite or front and rear face portions 53, 55 integrally formed with or interspaced between opposite or upper and lower end portions 57, 59, and laterally spaced ribs or abutment means 61, 63 are integrally provided on the rear face portions defining slot means therein in which clip member 15 is received with its side edges 43 in abutment with the ribs thereby to prevent laterally or side-wise displacement movement of the casing relative to the clip member. The ends of ribs 61, 63 are respectively engaged or supported by opposite projections 45 of clip member 15.

In the assembly of clip member 15 into engagement with stator 3 and beam 11, as shown in FIGS. 4-6, the clip member is initially positioned with its lower portion 39 against beam 11 and above recess 25 (FIG. 4), and the clip member is then forced or pushed downwardly thereby to insert its lower portion into the recess to a mounted position in interference-fit or displacement preventing engagement between beam 11 and slot key 27 (FIG. 5). As previously mentioned, limiting projections 47 are conjointly moved downwardly into abutting engagement with stator end face 9 about recess 25 thereby to define the mounted position of clip member 15 and to limit the extent that it can be inserted into the recess and the extent of engagement of lower portion 39 between beam 11 and slot key 27. When clip member 15 is so inserted into mounting engagement within recess 25, barbs 49 are connected in locking engagement with at least one of the laminations of stack 17 within the recess thereby to prevent displacement of clip member 15 from the recess.

For the sake of simplicity, the above description of the mounting of clip member 15 into interference-fit engagement between beam 11 and stator 3 did not consider the disposition of overload protector 13 in its mounting position by the clip member; however, prior to the insertion of the clip member to its mounting position in the recess, ribs 61, 63 of the overload protector are positioned or assembled in confronting or abutting engagement with opposite side edges 43 and projections 45 of the clip member which, as previously mentioned, prevents lateral or side-wise displacement of casing 51 relative to the clip member. In the above assembly of casing 51 onto clip member 15, upper end portion 57 of the casing is disposed beneath clip member tab 41 in engagement therewith. Casing 51 is thereafter conjointly movable with clip member 15 to their respective mounting positions. In the mounting position of casing 51, as shown in FIG. 6, front face portion 55 is preferably disposed in direct engagement with at least a portion of stator winding end turns 7 or else in close proximity thereto thereby to facilitate sensing of the ambient temperature adjacent end turns 7 by overload protector 13, and clip tab and projections 41, 45 support casing 51, as previously described. Alternatively, lower end portion 59 of casing 51 may be urged or biased into abutment with stator end face 9 between beam 11 and stator winding end turns 7. In this manner, overload protector 13 is, in effect, locked in its mounting position against displacement.

From the foregoing, it may be noted that there is provided clip member 15 for mounting overload protector 13 on dynamoelectric machine 1 and that the clip member is of simplistic design or construction which is economically manufactured and easily and very quickly assembled with the overload protector onto the dynamoelectric machine. It may also be noted that clip member 15 is retained in its mounted position without the necessity of providing and assembling therewith ancillary locking components since integral barbs 49 of the clip member are disposed in locking engagement with stator stack laminations 17 within recess 25. In addition to the above, it may be noted that clip member 15 is predeterminately and accurately located in its mounted position and accurately referenced with respect to the adjacent cooperating components of dynamoelectric machine 1 since projections 47 are predeterminately positioned on clip member 15 for locating or referencing engagement with stator end face 9 to predetermine the mounted position of the clip member. Furthermore, it may be noted that overload protector 13 is, in effect, locked in its mounted position against displacement since the upper end portion 57 thereof abuts with clip member tab 41 the rear face portion 53 is supported on projections 45 and the front face portions 55 is abutted with stator winding end turns 7, and ribs 61, 63 thereof confront or abut clip member side edges 43 to prevent lateral or side-wise displacement of the overload protector. Alternatively, lower end portion 59 of casing 51 may be urged or biased into engagement with stator end face 9. In addition to the foregoing, it may also be noted that strip 15 mounts casing 15 generally between end face 9 of the stator and the free end of the end turns.

Referring now to FIGS. 8 and 9, there is shown on another mounting or clip member 115 having substantially the same component parts and functioning substantially in the same manner in dynamoelectric machine 1 with the following exceptions.

In the event it is desirable for some reason not to utilize a slot key in stator stack 17 or else to dispose the slot key in another convenient location in that stack, then a plurality of openings, such as groove means 123, are provided adjacent the stator periphery intersecting therewith and extending generally axially of stator 3 between end faces 9 substantially in the same manner as the previously discussed openings 23. Of course, beams 11 are also disposed in openings 123 against displacement.

Clip member 115 is provided with a plurality of serrations or barbs 149 which extend generally laterally across lower portion 39 of clip member body 33, and these serrations are disposed in locking or displacement preventing engagement with at least some of the laminations of stack 17 within groove 123 when clip member 115 is inserted thereinto to its mounted position in interference-fit engagement between beam 11 and stator 3 in the same manner as previously described with respect to clip member 15. Further, it may be noted that clip member 115 is imbued with all of the advantageous features specifically pointed out hereinabove with respect to clip member 15 as well as those which are apparent.

From the foregoing, it is now apparent that a novel dynamoelectric machine 1 having novel mounting means 15, 115 therein for switch means 13 is provided meeting the objects and advantageous features set forth hereinbefore, as well as other objects and advantageous features, and it is contemplated that changes may be made by others in the configurations, shapes and details of the constructions illustrated herein for only the purpose of disclosure, which is not to be construed as limiting the scope of the invention in any manner, and such changes will not depart from the spirit or the scope of the invention, which is set out by the claims which follow.

What I claim as new and desire to secure by Letters Patent of the United States is:

1. In a dynamoelectric machine having a stator with a peripheral surface and at least one end face intersecting therewith, a plurality of windings in the stator having a generally annular grouping of end turns extending from the one end face, the end turns having a portion spaced generally radially inwardly of the peripheral surface of the stator, means for sensing the ambient temperature adjacent the end turns and operable generally to protect the windings in the event of an overload condition thereof; the combination therewith comprising means secured in displacement preventing engagement with at least a part of the stator generally adjacent the one end face thereof for mounting the sensing means between the peripheral surface of the stator and the portion of the end turns radially inwardly thereof and between the one end face and the free end of the end turns extending from the one end face.

2. A dynamoelectric machine as set forth in claim 1, comprising an opening in the stator intersecting with the one end face, the mounting means being removably secured with the stator part within the opening.

3. A dynamoelectric machine as set forth in claim 2, wherein said mounting means comprises an elongate strip having a portion inserted into the opening into the displacement preventing engagement with the stator part within the opening and another portion without the opening and disposed only between the peripheral surface of the stator and the portion of the end turns radially inwardly thereof for mounting engagement with the sensing means.

4. A dynamoelectric machine as set forth in claim 3, wherein the first named portion of the strip comprises means for effecting the displacement preventing engagement with the part of said stator within the opening.

5. A dynamoelectric machine as set forth in claim 3, wherein the other portion of the strip comprises at least one integral projection for engagement with the one end face generally about the opening to limit the extent of the insertion of the first named portion into the opening.

6. A dynamoelectric machine as set forth in claim 5, wherein the other portion of said strip comprises means engaged with a portion of the sensing means for urging it into abutment with the one end face.

7. A dynamoelectric machine as set forth in claim 3, wherein the other portion of the strip includes a pair of spaced means connected in supporting engagement with confronting abutments on in the sensing means for supporting it at least closely adjacent the portion of the end turns radially inwardly of the peripheral surface of the stator and for preventing movement of the sensing means toward and away from the one end face.

8. In a dynamoelectric machine having an end face of a stator adjacent end turns of stator windings, means for sensing the ambient temperature adjacent the end turns and protecting the stator windings in the event of an overload condition including a casing having opposite face portions interposed between opposite end portions; the combination therewith comprising means adapted to be secured in displacement preventing engagement with the stator adjacent the one end face thereof including means for generally side-wise displacement preventing engagement with one opposite face portion of the casing and for positioning the other opposite face portion thereof at least in close proximity to a portion of the end turns, and means engaged with the casing for maintaining one opposite end portion thereof at least in close proximity with the one end face of the stator adjacent the end turns.

9. In the dynamoelectric machine as set forth in claim 3, wherein the other portion of the strip includes a pair of spaced means engaged with confronting abutments on the sensing means for generally preventing lateral movement of the sensing means relative to the one end face.

10. In the dynamoelectric machine as set forth in claim 3, wherein the other portion of the strip includes a first pair of means spaced for displacement preventing engagement with confronting abutments on the sensing means to maintain it generally against side-wise movement relative to the one end face, and a second pair of means spaced for displacement preventing engagement with other confronting abutments in the sensing means to maintain it generally against end-wise movement toward and away from the one end face.

11. In the dynamoelectric machine as set forth in claim 3, wherein the opening generally constitutes a groove in the stator extending across the peripheral surface of the stator to intersect with the one end face, a structural component of the dynamoelectric machine disposed in the groove in displacement preventing engagement with the stator, and the first named portion of the strip being disposed in the groove between the structural component and another part of the stator within the groove confronting the structural component.

12. In the dynamoelectric machine as set forth in claim 1, wherein the stator is generally constituted by a stack of laminations, the opening extending across the peripheral surface and also intersecting therewith, a recess in the wall of the opening and generally coextensive therewith, a structural member of the dynamoelectric machine mounted in the opening in displacement preventing engagement with the stator, and means disposed in the recess for holding the laminations against relative movement at least prior to the mounting of the structural member in the opening, the mounting means being disposed in the opening between confronting portions of the structural member and the holding means.

13. In the dynamoelectric machine as set forth in claim 8, wherein the maintaining means holds the one opposite end portion in abutment with the end face of the stator adjacent the end turns.

14. In the dynamoelectric machine as set forth in claim 8, wherein the maintaining means includes a pair of means respectively engaged with the other opposite end portion and at least a confronting abutment on the one opposite face portion of the casing.

15. In the dynamoelectric machine as set forth in claim 8, wherein the side-wise displacement preventing means includes a pair of means respectively engaged at least with confronting abutments on the one opposite face portion of the casing.

16. In the dynamoelectric machine as set forth in claim 8, wherein the secured means is generally constituted by an elongate strip having an end associated with the stator to effect the displacement preventing engagement therewith of the secured means.

17. In the dynamoelectric machine as set forth in claim 16, wherein the strip includes a pair of spaced side edges which generally constitute the side-wise displacement preventing means, and a pair of spaced ribs on the one opposite face portion of the casing respectively in confronting engagement with the side edges of the strip.

18. In the dynamoelectric machine as set forth in claim 16, wherein the strip includes a bent over tab generally constituting the free end of the strip and engaged with the other opposite end portion of the casing, at least one abutment on the one opposite face portion of the casing generally oppositely facing with respect to the other opposite end portion of the casing, and means on the strip for abutting the one abutment on the casing, the tab and the abutting means generally constituting the maintaining means.

19. In combination, a dynamoelectric machine having a stator with a peripheral portion, at least one end face on the stator intersecting with the peripheral portion, at least one groove in the peripheral portion and intersecting with the end face, a beam disposed in the groove and extending therefrom past the one end face for supporting another structural component of the dynamoelectric machine, a plurality of windings in the stator having a generally annular grouping of end turns adjacent the one end face, the end turns having a portion spaced generally radially inwardly of the peripheral portion of the stator, means for sensing ambient temperature adjacent the end turns and for protecting the windings in the event of an overload condition; a space between confronting surfaces of the beam and groove within the groove, a metallic strip for disposing the sensing means adjacent the one end face and between the peripheral portion of the stator and the portion of the end turns spaced radially inwardly therefrom, the metallic strip including opposite ends, one of the opposite ends being inserted into the space, means on the one opposite end for displacement preventing engagement with at least a part of the stator within the groove, means on the strip for abutment with the one end face for positively limiting the insertion of the one opposite end of the strip into the space, and means on the other of the opposite ends of the strip disposed between the peripheral portion of the stator and the portion of the end turns generally radially inwardly thereof for mounting engagement with the sensing means, the other opposite end being engaged with the sensing means to maintain it against displacement from a position adjacent the one end face and between the peripheral portion of the stator and the portion of the end turns radially inwardly thereof and at least closely adjacent the end turns.

* * * * *